Nov. 1, 1955     J. R. OISHEI     2,722,455
WINDSHIELD WASHER
Filed Jan. 11, 1951
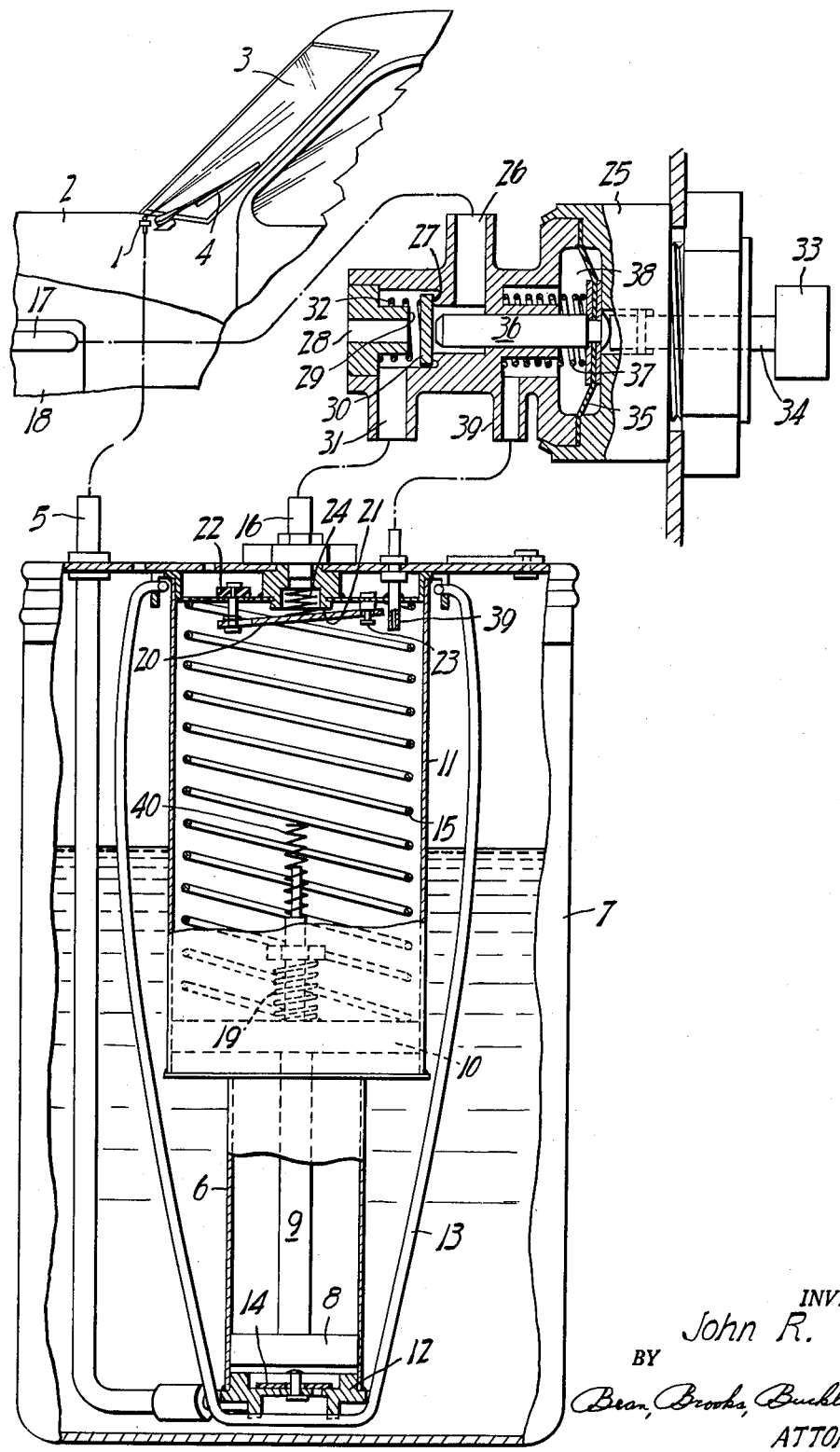
INVENTOR.
John R. Oishei
BY
Bean, Brooks, Buckley & Bean.
ATTORNEYS United States Patent Office 2,722,455
Patented Nov. 1, 1955

2,722,455

WINDSHIELD WASHER

John R. Oishei, Buffalo, N. Y., assignor to Trico Products Corporation, Buffalo, N. Y.

Application January 11, 1951, Serial No. 205,488

11 Claims. (Cl. 299—58)

This invention relates to the windshield cleaning field and especially to apparatus for spraying a liquid solvent onto the windshield. Prior devices to apply liquid mechanically to a windshield surface have necessitated considerable attention on the part of the motorist so that their use have distracted from the safe driving and manipulation of the motor vehicle.

The primary object of this invention is to provide an improved mechanical means which operates efficiently in applying a liquid solvent to the windshield and which requires a minimum amount of the motorist's attention so that the windshield may readily be washed with the least possible distraction from the safe control of the vehicle.

A further object of the invention is to provide a novel windshield washer having a cycle of operations which are successively carried out in an automatic manner after being once initiated by the motorist.

A still further object resides in a washing apparatus which is practical in operation, simple in design and installation, and economical in operation and upkeep.

The foregoing and other objects will appear as this description progresses, reference being had to the accompanying drawing, wherein the single view depicts the improved washer, with parts in section and other parts being diagrammatic in lay-out.

Referring more particularly to the drawing, a nozzle 1 is mounted on the cowl 2 for spraying water or other liquid solvent onto the windshield 3 for use by the wiper 4. The solvent is conducted to the nozzle by a conduit 5 from a pump cylinder 6 arranged within a reservoir or container 7. The pump plunger 8 is joined by a rod 9 to a fluid motor piston 10 reciprocating within a cylinder 11. In the disclosure, the pump and motor cylinders 6 and 11 are coaxially arranged and held together, with the pump head 12, by a bail 13. An inlet valve 14 admits solvent to the pump or transfer chamber on the upstroke of the plunger 8 for subsequent delivery through the nozzle during the next pump stroke under the urge of the spring 15.

The fluid motor 10, 11 is connected by a conduit 16 to a suitable source of suction, such as the intake manifold 17 of the internal combustion engine 18, while the underside of the piston 10 is opened to the atmospheric pressure, either directly, or indirectly as transmitted by the liquid content of the reservoir. The pressure differential acts upon the piston to elevate it against the tension of the motor spring 15 and thereby to actuate the pump plunger 8 on its liquid-intaking stroke. To avoid injury to the motor pump unit, should the liquid freeze in the chambers, the connecting rod 9 is attached to the piston 10 by a spring 19 which will accommodate the freeze expansion. The suction communication is shut off automatically by a valve 20 which is brought into engagement with its seat 21 by the motor piston as it reaches the upper limit of travel. A normally closed venting valve 22 is opened at this time by the motor piston through the valve 20 to admit atmospheric pressure to the motor chamber above the piston 10 for freeing the motor spring to function. The valve 20 is pivotally mounted by a pin 23 and when seated may be under the urge of a light spring 24 to avoid any sticking of the valve to its seat. When the valve 20 is seated it is held thereon by the suction or pressure differential set up in the part 21, and this holding pressure aids in holding the atmosphere valve 22 unseated. When the valve 22 is seated it is the atmosphere which assists in holding the valve 20 unseated.

A control unit for the washer is interposed in the suction line 16 for manually starting the washer operation and thereafter automatically continuing a series of steps which comprises the washing cycle. This control unit may be conveniently placed on the instrument panel of the motor vehicle and, as illustrated herein, comprises a body 25 having a suction supply passage 26, opening through a seat 27, and an atmospheric passage 28 leading to the outside atmosphere and opening through a seat 29 in opposition to the first seat 27. A valve 30 is interposed between these two seats or ports for selectively establishing communication between either passage 26 or 28 and a motor passage 31. A backing spring 32 acts normally to hold the valve in a port-closing position on the seat 27. The supply passage 26 is connected to the intake manifold by a section of the conduit 16, while the motor passage 31 communicates with the motor chamber 11 through another section of the conduit and also through the seat 21. A manual actuator, in the form of a depressible button 33 having a slidable mounting stem 34, is provided for shifting the valve 30 from its normal position on seat 27 to the seat 29 to open the suction supply to the motor chamber and to close off the atmospheric port 29, whereupon the motor-pump unit will start operating to intake liquid.

In accordance with the present invention, means are provided automatically to maintain the suction communication with the motor chamber throughout the intake stroke and the following delivery stroke. This will avoid the necessity of continuously holding the button down, the automatic retention being accomplished by manual actuation of the button 33 for a predetermined interval and then thereafter without further attention from the motorist. To this end, a power-responsive latch device 35—38 is arranged to hold the valve 30 in its shifted position wherein it closes the atmospheric port 29, such device being illustrated in the form of an auxiliary pneumatic motor having a diaphragm 35 which carries a valve-engaging latch pin 36, a pin-retracting spring 37, and a diaphragm chamber 38 in which the diaphragm operates. The chamber 38 is in constantly open communication with the motor chamber 11 through a restricting pressure-equalizing passage 39 which will be determinative of the required interval of manual actuation as more fully described hereinafter. Consequently, when the motor chamber is being evacuated a substantially like condition will follow in the diaphragm chamber 38 and result in a counteraction of the spring 37 and a projection of the latch pin 36 to hold the valve 30 in the position for closing the atmospheric port. Instead of having the hold-down pin 36 pneumatically projected, the preferred arrangement is such that the pin will be manually projected and for this purpose it is axially alined with the valve depressing stem 34 and is interposed between the valve and the stem to form, in effect, a continuation of the latter. Therefore, when the button is momentarily depressed, the stem 34 and the latch pin 36 will move as a unit to open the suction supply to the motor. Then the pressures in the motor chamber and the diaphragm chamber will rapidly drop whereupon the motor will actuate the pump while the pressure differential acting on the diaphragm of the latch motor 35—38 will continue to hold the valve 30 depressed against the action of the two springs 32 and 37 to hold open the suction communication for insuring a continuance of the pump operation. As the motor piston 10 rises in its chamber, a spring 40 on the piston will contact the valve 20 and compress to store up energy sufficient to break the air seal 22 and to snap the suction valve 20 to its seat. The admission of atmospheric air to the motor chamber will free the motor spring 15 to function. Concurrently therewith, substantially, the pressure-equalizing passage 39 will cause the pressure in chamber 38 to rise and withdraw the latch pin to free the spring 32 to reseat the valve 30 over the suction port. The relative size or capacity of the pressure equalizing passage with respect to the suction supply passage 16 may be changed to provide any time lag desired in the response of the latch motor relative to the pump motor.

The operation of the windshield washer embodying the present invention is apparent from the foregoing. The motorist need only depress the button 33 momentarily to open the suction communication 26 and to close off the atmospheric passage 28 whereupon the pressure-responsive latch will secure the valve 30 operative until the intake stroke of the pump has been completed. Thereafter the suction is closed off by another valve, namely valve 20, the vacuum inside the chambers 11 and 38 is dissipated, and the pump freed to deliver its charge of solvent onto the windshield. After the manual start of the mechanism, the cycle of operation is automatic, leaving the motorist free to devote his attention to the safe driving of the vehicle. The washer is uniform in the volume of solvent applied as well as in the results obtained.

Furthermore, it is noted that while the pump cycle of operation is first to intake the solvent and then to discharge it through the nozzle, nevertheless this cycle may be reversed by having the discharge stroke first and follow it with the intake stroke. It is apparent that the operating pressure may be positive instead of negative, necessitating a reversal of parts in the mechanism obvious to those skilled in the art, and while the foregoing description has been given in detail for clarity, it is without thought of limitation since the inventive principles involved are capable of assuming other physical embodiments without departing from the spirit of the invention and the scope of the appended claims.

What is claimed is:

1. A windshield washer including means for spraying solvent on a windshield and having a solvent ejecting motor pump unit with a motor chamber provided with an atmospheric vent, a piston reciprocable in the chamber to impart intake and discharge strokes to the pump, a suction line opening into the chamber through a port, valve means normally closing the vent and opening the port for one pump stroke and operable by the motor to reverse the valve means to open the vent and close the port for the other pump stroke, and a control unit manually operable to open the chamber to operating pressure and having a motor chamber with a suction responsive retaining member acting to retain the pump unit operating during said one stroke of the pump and thereafter to interrupt the pressure communication, said second chamber having direct communication with the first chamber when the suction dissipates from the first chamber, said second chamber having a direct pressure equalizing communication with the first chamber.

2. A windshield washer including means for spraying solvent on a windshield and having a solvent ejecting motor-pump unit with an intake stroke and a delivery stroke, said unit having a motor chamber with an atmospheric vent and a pressure supply port, valve means normally closing the vent and opening the port, means operable by the motor on the intake stroke to reverse the valve means to open the vent and close the port, a normally closed control valve manually opened to establish a pressure communication through the port to start motor operation, latch means responsive to the pressure in the motor chamber and operable to maintain the control valve opened after manual effort has been removed, and means operable to withdraw the latch means by and upon reversal of the valve means.

3. A windshield washer including means for spraying solvent on a windshield and having a solvent ejecting motor-pump unit with an intake stroke and a delivery stroke, said unit having a motor chamber with an atmospheric vent and a pressure supply port, valve means normally closing the vent and opening the port, means operable by the motor on the intake stroke to reverse the valve means to open the vent and close the port, a normally closed control valve manually opened to establish a pressure communication through the port to start motor operation, latch means responsive to the pressure in the motor chamber and operable to maintain the control valve opened after manual effort has been removed, and means responsive to the pressure in the motor chamber subsequent to valve reversal for rendering the latch means inoperative.

4. A windshield washer including means for spraying solvent on a windshield and having a solvent ejecting motor-pump unit with an intake stroke and a delivery stroke, said unit having a motor chamber with an atmospheric vent and a pressure supply port, valve means normally closing the vent and opening the port, means operable by the motor on the intake stroke to reverse the valve means to open the vent and close the port, and a control unit manually operable to set the first unit in operation for its intake stroke, with means responsive to the chamber pressure for taking over the manual control and holding it until the start of the delivery stroke following the reversal of the valve means.

5. A windshield washer including means for spraying solvent on a windshield and having a solvent ejecting motor-pump unit with an intake stroke and a delivery stroke, said unit having a motor change with an atmospheric vent and a pressure supply port, valve means normally closing the vent and opening the port, means operable by the motor on the intake stroke to reverse the valve means to open the vent and close the port, and a control unit manually operable to set the first unit in operation for its intake stroke, said control unit comprising a normally closed valve, a manually depressible pin operable to open the valve, and means responsive to the chamber pressure for holding the valve opened until said valve means are reversed.

6. A windshield washer including means for spraying solvent on a windshield and having a solvent ejecting motor-pump unit with an intake stroke and a delivery stroke, said unit having a motor chamber with an atmospheric vent and a pressure supply port, valve means normally closing the vent and opening the port, means operable by the motor on the intake stroke to reverse the valve means to open the vent and close the port, and a control unit manually operable to set the first unit in operation for its intake stroke, said control unit comprising a normally closed valve, a manually depressible pin operable to open the valve, a latch settable by said pin to secure the valve in its opened position after manual release of the pin, and means responsive to the chamber pressure to render the latch inoperative after the reversal of said valve means.

7. A windshield washer having a motor-pump unit with a pressure receiving motor chamber, a pump delivery nozzle, pressure supply means operable to render the unit operable for a pumping cycle, manual means operable to set the pressure supply means in operation and having means communicating with pressure in the motor chamber for maintaining said pressure supply means operative following manual actuation thereof for a predetermined interval, and interval determining means operable to interrupt the supply of pressure to the chamber.

8. A windshield washer including means for spraying solvent on a windshield and comprising a fluid displacing unit having a pump with an intake stroke and a delivery stroke and a motor with a fluid pressure actuated stroke and a spring-returned stroke, said motor having an operating chamber with a pressure port and an atmospheric port and valve means acting to close one port while opening the other port, and vice versa, a control valve manually operable to supply the motor with an operating pressure, means responsive to the chamber pressure for maintaining the control valve opened following the manual actuating, an equalizing passage between the chamber and the maintaining means for dissipating the holding pressure when the atmospheric port is opened, and means operable by the motor on its pressure actuated stroke to operate the valve means to so open the atmospheric port.

9. A windshield washer including means for spraying solvent on a windshield and comprising a fluid displacing unit having a pump with an intake stroke and a delivery stroke and a motor with a fluid pressure actuated stroke and a spring-returned stroke, said motor having an operating chamber with a pressure port and an atmospheric port and valve means acting to close one port while compelling the opening of the other port, and vice versa, a control valve manually operable to supply the motor with an operating pressure, means responsive to the chamber pressure for maintaining the control valve opened following the manual actuation, a passage providing constant communication between the chamber and the maintaining means, and means operable to reverse the valve means to vent the chamber to the atmosphere and thereby render the maintaining means inoperative, said control valve when closed acting to vent the chamber through the pressure port.

10. A manually-triggered control unit for windshield washers having pressure inlet and outlet ports, spring pressed valve means communicating at one end with the atmosphere and being positioned intermediate said inlet and outlet ports so as to be adapted in its closed position to block communication between said ports while causing one of said ports to communicate with the atmosphere, and manually operable means adapted to actuate said valve means out of said closed position thereof and including pressure-responsive latch means and pressure cut off means, said latch means communicating with the pressure in said one port and actuated thereby to automatically retain the valve means out of said closed position except when communication of said pressure-responsive latch means with said one port pressure is cut off by said pressure cut off means.

11. A manually-triggered control unit substantially as described in claim 10 wherein said pressure-responsive latch means selectively communicates by means of a pressure equalizing passage with said one port when said valve means is actuated out of said closed position.

References Cited in the file of this patent

UNITED STATES PATENTS

| | | |
|---|---|---|
| 1,390,617 | Jay | Sept. 13, 1921 |
| 1,722,791 | Gillen | July 30, 1929 |
| 2,114,558 | Dismukes | Apr. 19, 1938 |
| 2,142,056 | Horton | Dec. 27, 1938 |
| 2,153,519 | Horton | Apr. 4, 1939 |
| 2,207,806 | Hollmann | July 16, 1940 |
| 2,287,760 | Hicks | June 23, 1942 |
| 2,540,290 | Rappl et al. | Feb. 6, 1951 |